United States Patent [19]
Baxter et al.

[11] Patent Number: 6,021,282
[45] Date of Patent: Feb. 1, 2000

[54] CONTROL APPARATUS FOR FILM ADVANCE DRIVE MOTOR IN A CAMERA

[75] Inventors: Dennis E. Baxter, East Rochester; Thomas S. Albrecht, Canandaigua; Shannon A. Young; Leonard R. Richiuso, both of Rochester, all of N.Y.

[73] Assignee: Eastman Kodak Company, Rochester, N.Y.

[21] Appl. No.: 09/123,688

[22] Filed: Jul. 28, 1998

[51] Int. Cl.[7] .................................................. G03B 17/24
[52] U.S. Cl. ........................... 396/398; 396/403; 396/543
[58] Field of Search .................................... 396/395, 397, 396/398, 403, 543

[56] References Cited

U.S. PATENT DOCUMENTS

| | | |
|---|---|---|
| 2,457,095 | 12/1948 | Strother . |
| 2,758,181 | 8/1956 | Crouch . |
| 3,169,460 | 2/1965 | Winkler et al. . |
| 3,568,584 | 3/1971 | Harvey ...................................... 396/398 |
| 4,075,644 | 2/1978 | Hosono . |
| 4,084,169 | 4/1978 | Iwata et al. . |
| 5,315,077 | 5/1994 | Simon et al. . |

Primary Examiner—David M. Gray
Attorney, Agent, or Firm—Frank Pincelli

[57] ABSTRACT

A camera and method for controlling operation of the camera. The camera includes a film path for receiving a filmstrip and a transport mechanism for advancing the filmstrip along the film path. A motor connected to the transport mechanism is provided for advancing the filmstrip along the film path. A switch is provided for simultaneously turning off the motor and applying a braking force such that coasting of the motor is substantially eliminated

4 Claims, 7 Drawing Sheets

CONTROL APPARATUS FOR FILM ADVANCE DRIVE MOTOR IN A CAMERA

FIELD OF THE INVENTION

The present invention is directed to the field of photography. More particularly, the present invention is directed to a camera which utilizes a motor for advancing a strip of film in a frame by frame manner.

BACKGROUND OF THE INVENTION

A strip of film is incrementally advanced in a camera to position an unexposed frame to an exposed gate for exposure. The accurate advancement and registration of each frame to the exposure gate is critical to ensure correct frame-to-frame spacing and avoid an overlap of exposing images.

While various devices have been disclosed for metering a filmstrip in the camera, one such device is disclosed in copending application U.S. Ser. No. 08/992,851; filed Dec. 18, 1997; entitled METERING APPARATUS; of Anthony DiRisio, Leonard Richiuso and Shannon Young. While prior art devices provide very satisfactory service in a camera which manually advances the film, a problem exists when a motor is used for advancing of the film within the camera. The stopping position of metered film between an ambient environment utilizing fresh batteries and a cold environment using weak batteries can produce a significant difference in the stopping position of the film due to coasting of the motor. During the time after which the motor is turned off the film may travel due to coasting of the motor.

Thus, there is a need to provide a mechanism for accurately stopping of the film once the motor for advancing the film has been turned off.

SUMMARY OF THE INVENTION

According to one aspect of the invention there is provided a mechanism for consistently and accurately stopping and positioning a filmstrip once the motor used for advancing of the filmstrip has been turned off.

Another object of the present invention is providing a metering and stopping advancement mechanism which is not subjected to various environmental conditions to which the camera may be placed.

In another object of the present invention there is provided a method of controlling operation of the camera having a transport mechanism which utilizes the motor for advancing the filmstrip.

These objects are given only by way of illustration, thus, other desirable objects and advantages inherently achieved by the disclosed invention may occur or be apparent to those skilled in the art. The invention is defined by the pending claims.

According to one aspect of the present invention there is provided a camera having a film path for receiving a filmstrip and a transport mechanism for advancing the filmstrip along the film path. A motor connected to the transport mechanism is provided for advancing the filmstrip along the film path. A switch is provided for simultaneously turning off the motor and applying a braking force such that coasting of the motor is substantially eliminated.

In another aspect of the present invention it is provided a method for controlling the operation of the camera having a motor for advancing the filmstrip along a film path. The method comprises the steps of:

a) advancing the filmstrip along the film path using a motor; and b) simultaneously turning off the motor and shorting the motor so as to apply a breaking force to the motor after filmstrip has been advanced a predetermined amount along the film path.

BRIEF DESCRIPTION OF THE DRAWINGS

The foregoing and other objects, features and advantages of the invention will be apparent from the following more particular description of the preferred embodiments of the invention, as illustrated in the accompanying drawings wherein:

FIG. 9a is a perspective view of the switching mechanism illustrated in FIG. 7 in the initial position used to advance the filmstrip in the camera;

FIG. 9b is an electrical schematic of the switch of FIG. 9a;

FIG. 10b is a schematic representation of the operation of the switch of FIG. 10a.

DETAILED DESCRIPTION OF THE INVENTION

The following a detailed description of the preferred embodiments of the invention, reference being made to the drawings in which the same reference numerals identify the same elements of structure in each of the figures illustrated.

Figure 1:
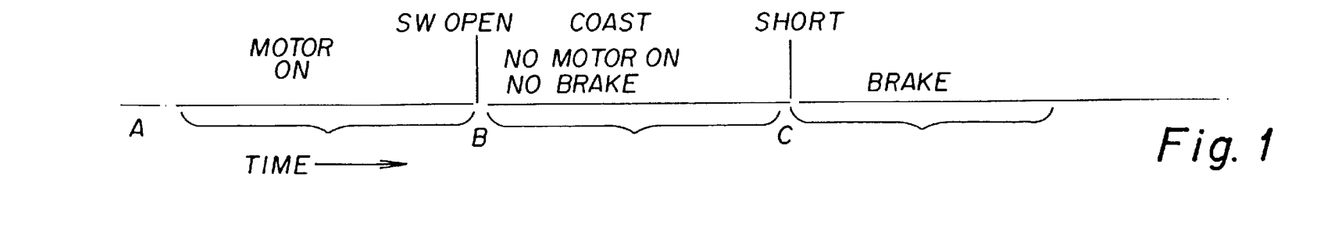
FIG. 1 is a schematic diagram of the operation of a motor in a camera of the prior art.

Referring to FIG. 1, there is illustrated a diagrammatic representation of the operation of a motor used to advance a filmstrip in a camera of the prior art versus time. At point A, the motor is turned on and is operated until point B, wherein a switch is engaged which turns off the motor used to advance the filmstrip. From the time immediately after the motor is turned off, there is a coast period wherein the motor continues to advance the filmstrip for a short period of time (illustrated by the distance from point B to point C). At point C, a brake may be applied at which time the motor no longer operates and the film is stopped from any further advancement.

Figure 2:
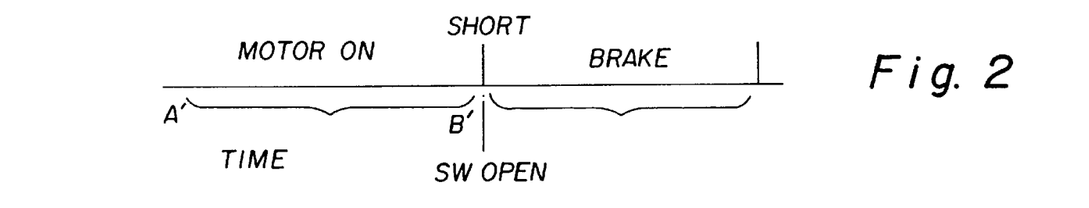
FIG. 2 is a schematic diagram illustrating the operation of a motor of a camera made in accordance with the present invention.
Figure 3:
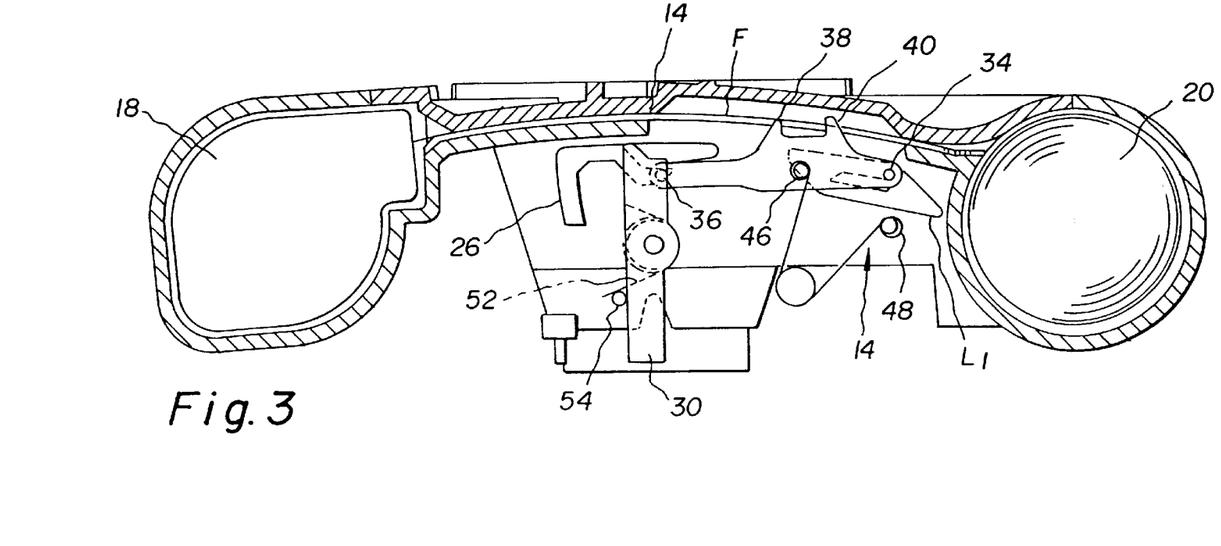
FIG. 3 is a top view of a camera body made in accordance with the present invention.

Referring to FIG. 2, there is illustrated the operation of a motor in a camera made in accordance with the present invention. At A', the switch used to control operation of the motor is turned on, and at B', the motor is turned off. However, at substantially the same time, or shortly before the motor is turned off, a braking force is applied to the motor thereby eliminating the coasting portion which occurs in prior art devices. In one embodiment of the present invention, the brake is applied by shorting the motor at the same time or just slightly before the motor is turned off such that the act of shorting of the motor applies a braking force which stops any further advancing of the filmstrip.

Referring to FIGS. 3–7, there is illustrated a camera 10 made in accordance with the present invention. The camera 10 is provided with a transport mechanism 12 for transporting and metering a filmstrip F along a film transport path 14 in a camera body 16 between two locations, as shown as first chamber 18 and second chamber 20. Transport and metering mechanism 14 comprises a moveable metering member 22, first and second tracks 24,26, a resilient member 28, a de-metering lever 30, and motor actuating member 32. The metering mechanism 14 disclosed herein is described in copending application U.S. Ser. No. 08/992,851, previously referred to and which is hereby incorporated by reference.

First and second tracks 24,26 are stationarily disposed on camera body 16. Preferably, first track 24 defines a continuous loop, while second track 26 defines a slot or channel which is not a continuous loop. First track 24 includes a front surface F1, a rear surface R1, an upper surface U1, and a lower surface L1. Second track 26 includes an upper surface U2, a front surface F2, and a lower surface L2.

Metering member 22 includes a first tracking pin 34 and a second tracking pin 36 adapted to engage first and second tracks 24,26, respectively, for slidable and pivotally movement therealong. Metering member 22 further includes a sensing tooth 38 and metering tooth 40, each adapted to engage a frame registering filmstrip perforation (not shown) provided in the filmstrip F. Sensing tooth 38 and metering tooth 40 are each preferably defined by at least one sloped surface 39,41, respectively; the sloped surfaces 39,41 being directed toward each other. The sloped surfaces 39,41 both facilitate the release and engagement of the teeth 38,40. A surface 43 is provided on metering tooth 40 and is preferably angled so as to promote mechanical association between metering member 22 and the filmstrip's perforation.

Resilient member 44 biases metering member 22 toward the film transport path 14. Resilient member 44 is preferably a spring which is associated to metering member 22 by a first mounting pin 46 and to camera body 16 by second mounting pin 48. Mounting pins 46,48 are positioned so as to define a force vector, which biases metering member 22 toward the film transport path 14. A suitable spring force resilient member 44 permits thrusting of the film, yet provides appropriate biasing for the engagement of a metering member 14 and the filmstrip F.

Figure 4:
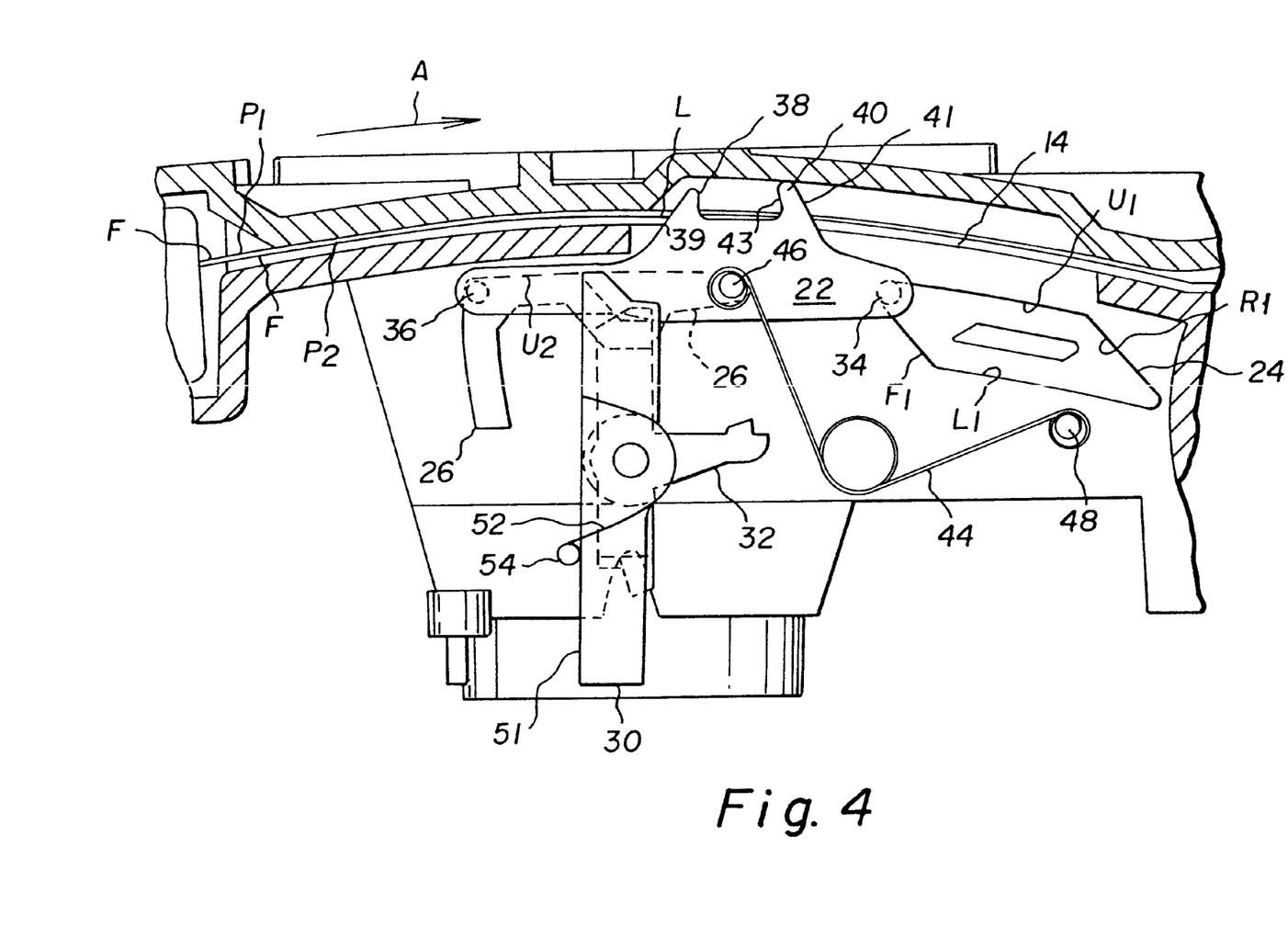
FIG. 4 is an enlarged partial top view of the camera body shown in FIG. 3.
Figure 5:
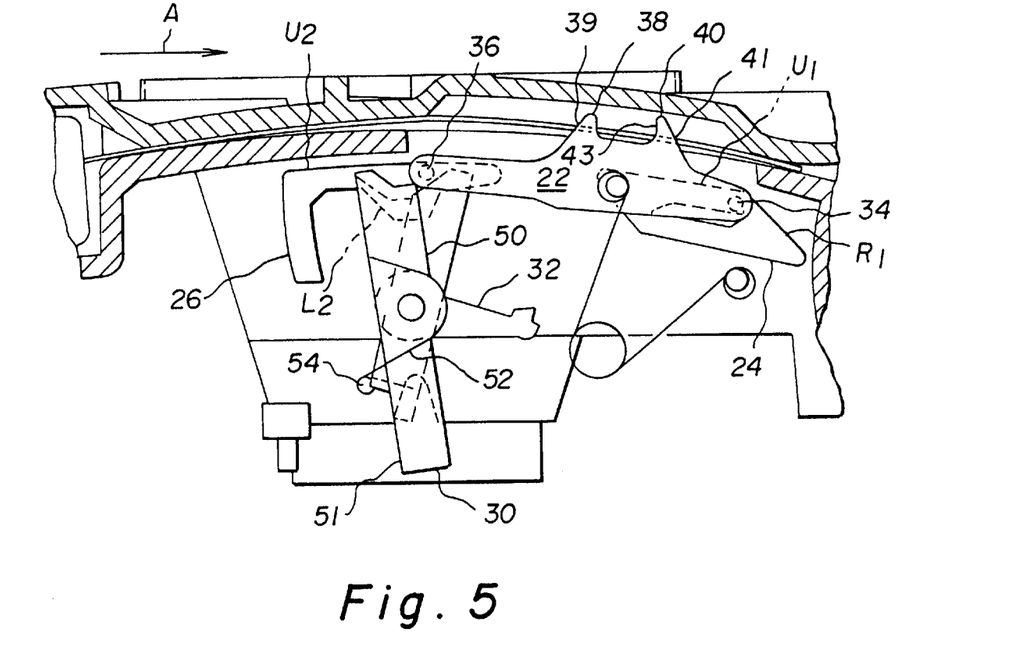
FIG. 5 is a partial view similar to FIG. 4 illustrating a serial position of the filmstrip as it travels along the film path in relationship to the metering mechanism.

De-metering lever 30 includes a blocking surface 50 and an actuating surface 51. A tortional spring 52 biases de-metering lever 30 against the stop member 54 to define a rest position, as illustrated in FIG. 4. De-metering lever 30 is actuated by manual or automatic means, such as a lever or shutter firing mechanism (not shown). Blocking surface 50 is formed as an arc about a center of rotation 56 of de-metering lever 30. Such a configuration provides a self-locking feature since a force from second tracking pin 36 would be directed through center 56 of de-metering lever 30, whereby no net torque would result.

The metering apparatus of the present invention provides for the initial positioning (that is, thrusting of the filmstrip during initial loading), metering during advancement of the filmstrip, and rewinding of the filmstrip. The operation of the metering apparatus is discussed in greater detail in copending application U.S. Ser. No, 08/992,851.

Figure 6:
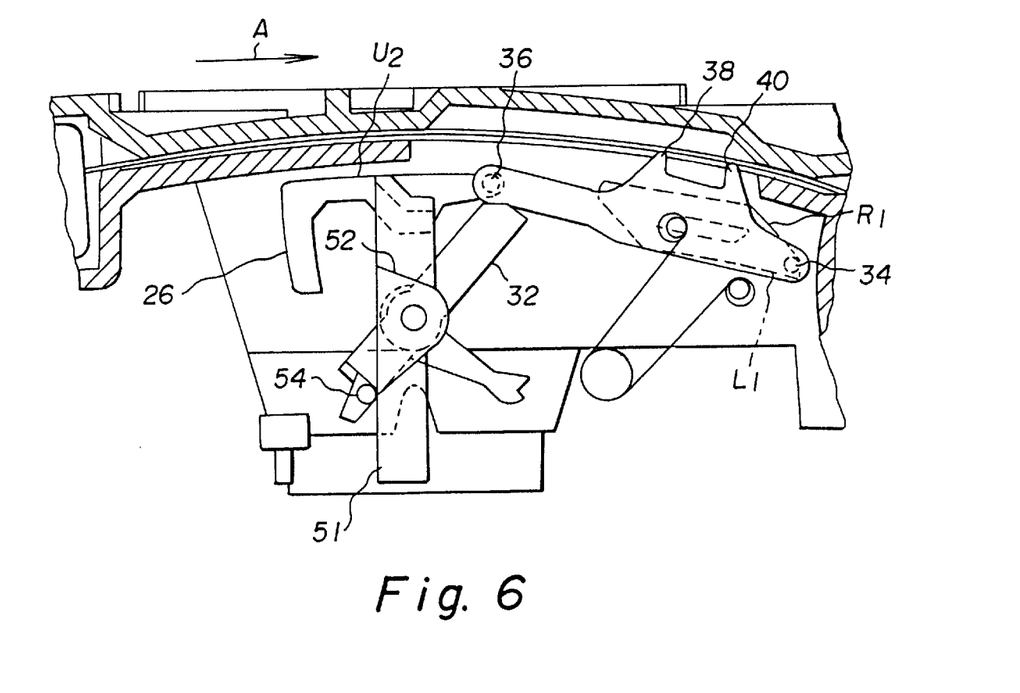
FIG. 6 is a view similar to FIG. 5 illustrating the next position of the filmstrip in the film path and its associated parts.

FIG. 4 illustrates the initial position of the metering mechanism as the film F is being initially advanced from chamber 18 to chamber 20. The engaged perforations are moved along to the position illustrated in FIG. 5 whereby the first tracking pin 34 follows first track 24. FIG. 6 illustrates the de-metering member 22 when movement of the filmstrip F has moved the predetermined amount provided by the metering mechanism. As metering member 22 moves from the position illustrated in FIG. 5 to that of FIG. 6, pin 36 engages surface 64 of actuation member 32 causing it to move from the position illustrated in FIG. 9a to FIG. 10b. The actuating member 32 is biased by spring 62 to maintain it in the position illustrated in FIG. 4. When the metering member 22 is moved to the end position illustrated in FIG. 6, pin 36 disengages mating surface 64 of actuating member 32 so as to return to the position illustrated in FIG. 4.

Figure 7:
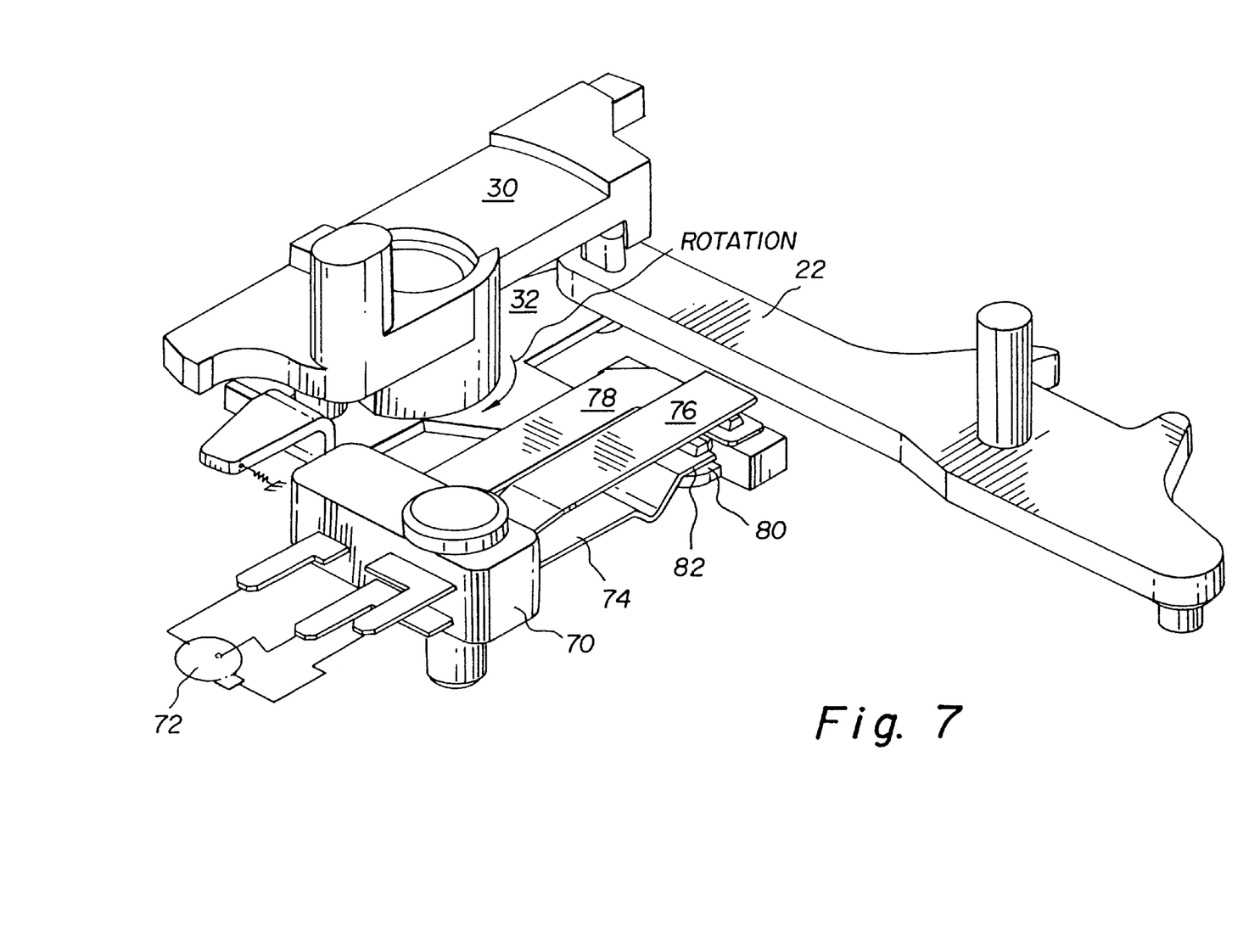
FIG. 7 is a perspective partial view of the device illustrated in FIG. 4 illustrating therewith the switch used to control operation of a motor used for advancing of the filmstrip.
Figure 8:
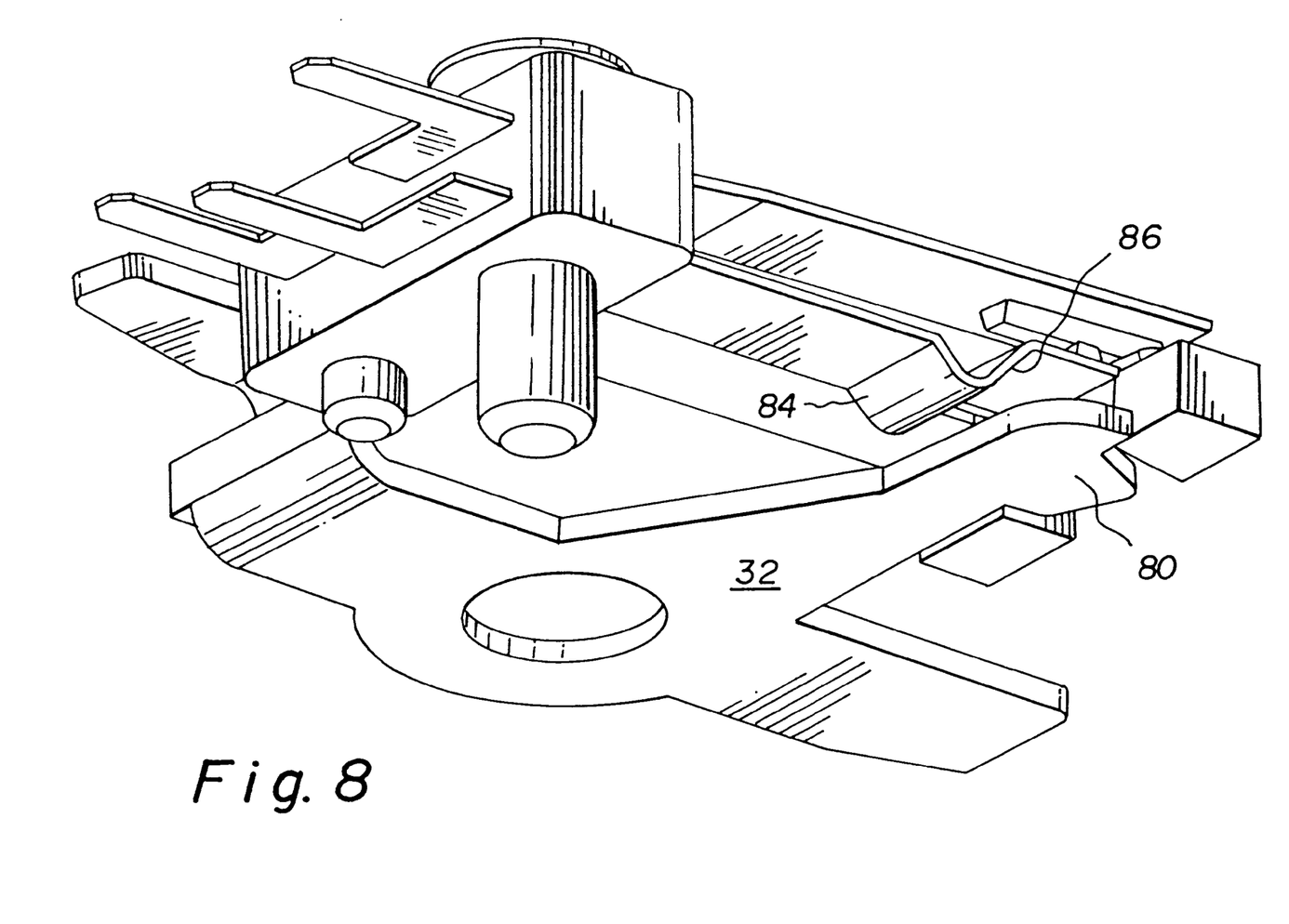
FIG. 8 is a bottom perspective view of the switch illustrated in FIG. 7.

Referring to FIGS. 7 and 8, there is illustrated switch 70 which is used to control DC motor 72, which is used for advancing of the filmstrip F as is typically done in the prior art. For example, the motor 72 may be used for thrusting of the film from chamber 18 by rotating the spool in the film cartridge supplying the filmstrip for, or used to wind the filmstrip F by rotating a spool, not shown, provided in chamber 20 used for advancing the filmstrip F for image exposure of adjacent frames on the filmstrip. The switch 70 includes a first contact 74, a second contact 76, and third contact 78. Contact member 74 has a raised contact projection 75 and contact member 78 has a contact projection 79 designed to contact projection 81 on contact member 76. Actuating member 32 has a projecting arm 80 having a top surface 82, which is designed to engage projecting member 84 on contact member 74. The projecting member 84 is provided with a ramp surface 86 for allowing the top surface 82 for riding thereon such that contact member 74 would be caused to be moved in the upward direction toward contact 76 to so as to cause contact member 76 to disengage from contact member 78 breaking electrical contact therebetween.

Figures 9A, 9B:
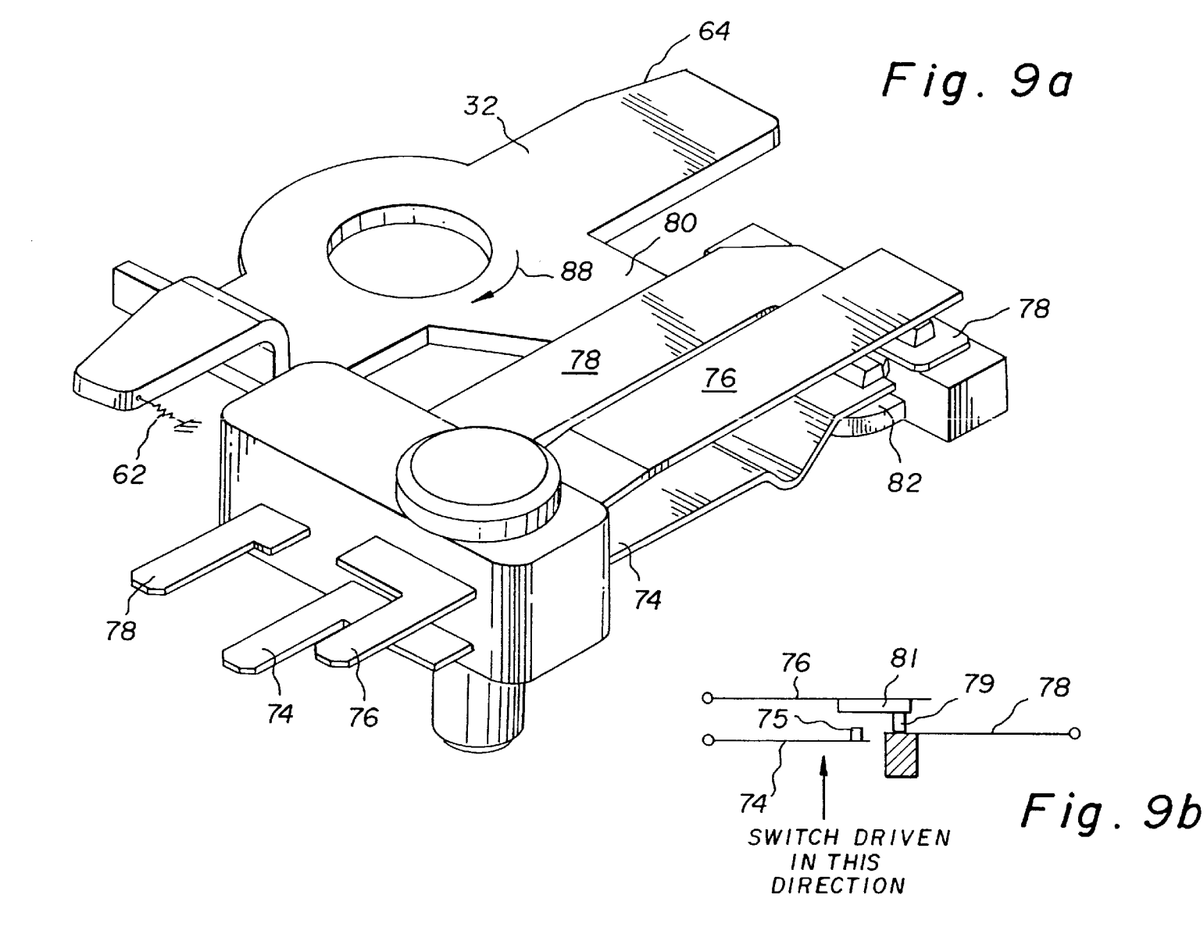
Figure 10A:
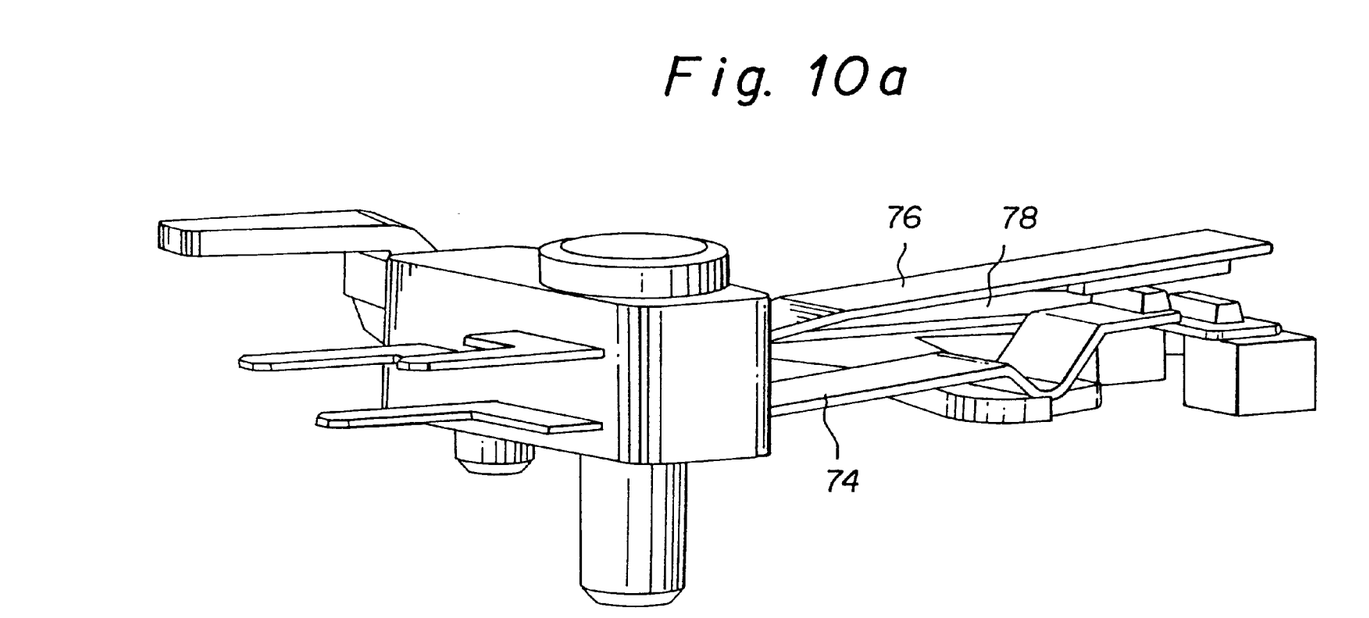
FIG. 10a is a perspective view of the switch of FIG. 9a illustrating the switch in the closed position wherein the motor is disengaged from further advancing the filmstrip.
Figure 10B:
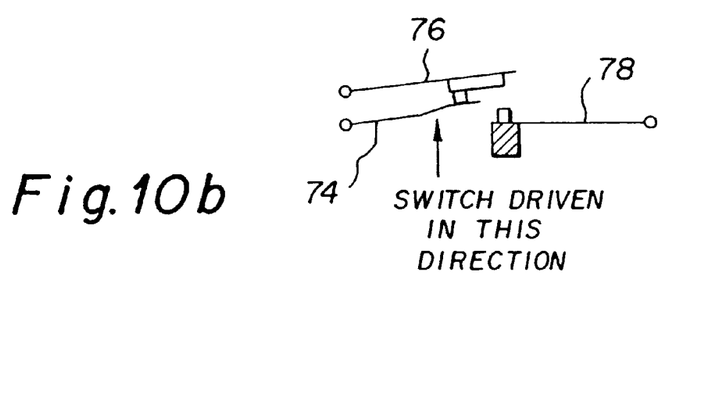

Referring to FIGS. 9a and 9b, when the actuating member is in this position, a closed electrical circuit is made between contact members 76 and 78, which provides electrical power to the motor 72, thus, advancing the filmstrip F. When the second tracking pin 36 engages edge 64, this causes the actuating member 32 to rotate in the direction indicated by arrow 88, which causes the projection 84 to ride on surface 82, causing the contact member 78 to disengage contact member 76 from member 78, as illustrated in FIGS. 10a and 10b, thereby breaking the electrical circuit that provides power to motor 72. However, in this position, as illustrated in FIG. 10b, an electrical short is created across motor 72. This short applies a braking force to the motor 72. This terminates any further advancing of the film until appropriate mechanism is used for restarting movement of the metering lever 30, which then causes the contacts 76,78 to go in the position as illustrated in FIG. 9b for operation thereof. This process is repeated for each exposure on the filmstrip.

A camera made in accordance with the present invention provides means for applying a braking force simultaneously or shortly before power to the motor for advancing the filmstrip is stopped; thus, substantially no coasting of the motor occurs.

The invention has been described in detail with particular reference to certain preferred embodiments thereof, but it will be understood that variations and modifications can be effected within the scope of the invention. For example any appropriate mechanism may be used for metering and advancing of the film. Additionally other methods may be employed for applying of the breaking force to the motor substantially at the same time, or shortly before, the motor is turned off. The present invention being defined by the following claims.

PARTS LIST 10 camera
12 transport mechanism
14 transport path
14 metering mechanism
16 camera body
18 first chamber
20 second chamber
22 moveable metering member
24 first track
26 second track
28 resilient member
30d e-metering lever
32 motor actuating member
34 first tracking pin
36 second tracking pin
38 sensing tooth
39,41 sloped surface
40 metering tooth
43 surface
44 resilient member
46 first mounting pin
48 second mounting pin
50 blocking surface
51 actuating surface
52 tortional spring
54 stop member
56 center of rotation
62 spring
64 surface
70 switch
72 DC motor
74 first contact
75 raised contact projection
76 second contact
78 third contact
79 contact projection
80 projecting arm
81 projection
82 top surface
84 projecting member
88 arrow
F1 front surface of first track
R1 rear surface of first track
U1 upper surface of first track
L1 lower surface of first track
U2 upper surface of second track
F2 front surface of second track
L2 lower surface of second track

What is claimed is:

1. A camera comprising:
a film path within said camera for receiving a filmstrip;
a transport mechanism for advancing said filmstrip along said film path;
a motor connected to said transport mechanism for advancing said filmstrip along said film path; and
a switch for simultaneously turning off said DC motor and applying a breaking force to said motor, said switch comprising a first contact, a second contact and a third contact, said first contact being movable between a first position and a second position, when said second and third contacts are in the electrically closed position and said first contact is in the first position power is being supplied to said motor, when said first contact is moved to the second position it breaks electrical contact between said second and third contacts and shorts said motor.

2. A switch for controlling operation of a motor used for advancing a filmstrip within a camera, said switch comprising a first contact, a second contact and a third contact, said first contact being movable between a first position and a second position, when said second and third contacts are in the electrically closed position and said first contact is in the first position power is being supplied to said motor, when said first contact is moved to the second position it breaks electrical contact between said second and third contacts and shorts said motor.

3. A switch for controlling operation of a motor used for advancing a filmstrip within a camera according to claim 2 further comprising an arm for moving said first contact between the first and second positions.

4. A switch for controlling operation of a motor used for advancing a filmstrip within a camera according to claim 3 wherein said arm includes a ramp for moving of said arm when said arm is rotated.

* * * * *